May 10, 1949.  J. J. LOW  2,469,566
SPRING SUSPENSION FOR VEHICLE TRUCKS
Filed June 18, 1945  3 Sheets-Sheet 1

INVENTOR.
JOHN J. LOW,
BY
Edwin D. Jones,
ATTORNEY.

May 10, 1949. J. J. LOW 2,469,566
SPRING SUSPENSION FOR VEHICLE TRUCKS
Filed June 18, 1945 3 Sheets-Sheet 2
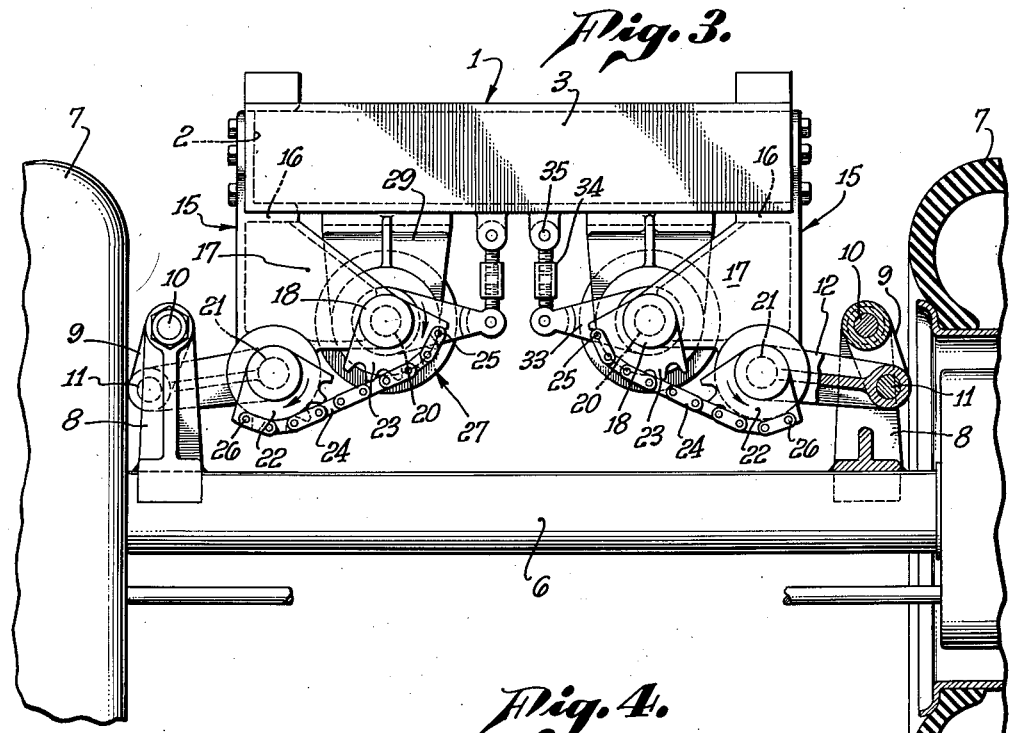
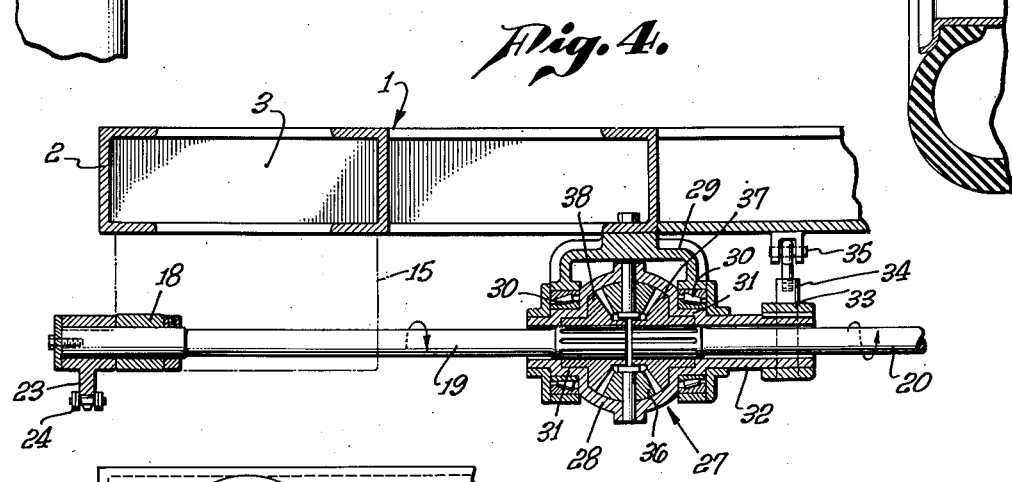
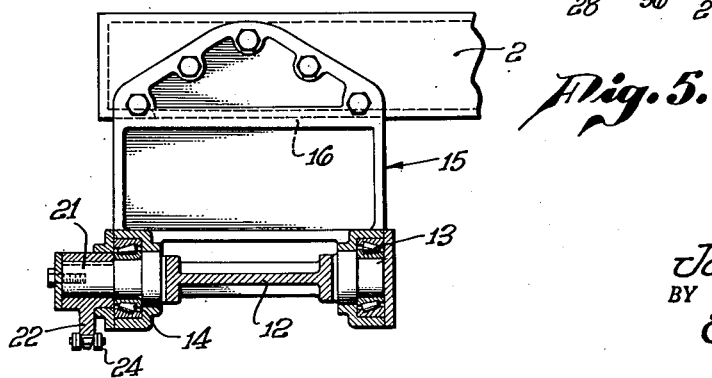
INVENTOR.
JOHN J. LOW,
BY
Edwin D. Jones,
ATTORNEY.

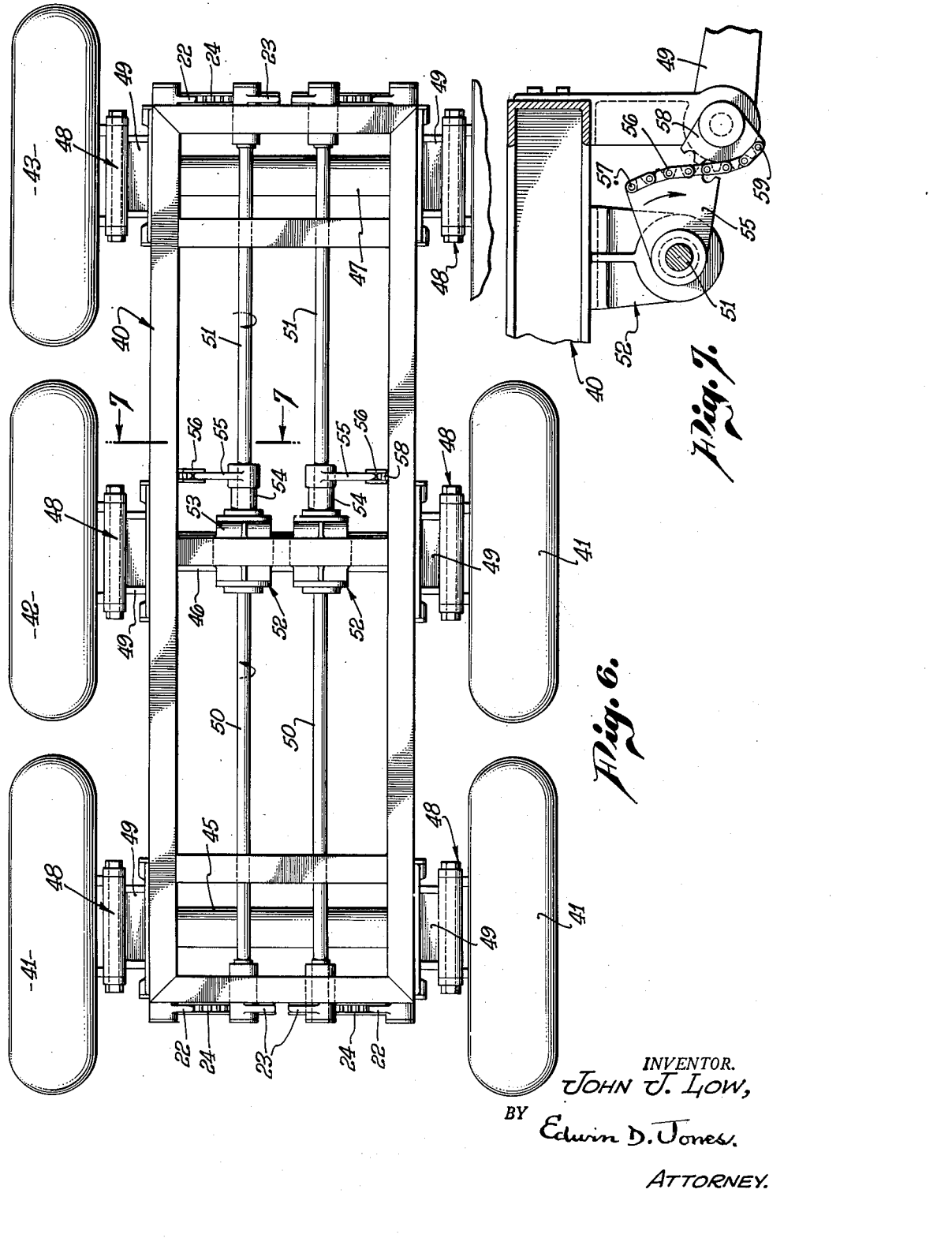

Patented May 10, 1949

2,469,566

UNITED STATES PATENT OFFICE 2,469,566

SPRING SUSPENSION FOR VEHICLE TRUCKS

John J. Low, Los Angeles, Calif.

Application June 18, 1945, Serial No. 600,102

11 Claims. (Cl. 280—104.5)

My invention relates to a spring suspension for vehicle trucks, and one of the purposes of the invention is to provide a torsion-spring type of suspension that will eliminate the use of relatively heavy leaf springs generally employed in such suspensions, and thereby reduce the chassis weight and correspondingly increase the "payload" of the truck.

Another purpose of my invention is to provide a spring suspension applicable to trucks having four, or six wheels, as examples, so constructed that the load on the wheels is automatically equalized. In this way the pressure of the tire tread on the road surface is maintained at a safe limit, equalizing the wear on all tires, and reducing scuffing.

Another purpose of my invention is to provide a spring suspension that will tie the truck wheels togther with more solidarity in the fore and aft direction than is possible with leaf-spring types of suspensions, thereby especially adapting the truck for employing a drive to the truck wheels if such a drive is desired.

Another purpose of my invention is to provide a suspension of this type with features of construction enabling the location of the truck frame to be lowered with respect to the wheels and the roadway, and thereby lowering the center of gravity of the load and reducing tendency to body sway.

Another purpose of my invention is to provide a suspension of this type that will eliminate any transfer of axle torque load between axles caused by braking or driving torque.

By reason of the equalization of load on all wheels I secure equal driving and braking effort on all wheels in the suspension unit under all operating conditions.

Another object is to provide a suspension in which the over-all width of the truck frame or sub-frame is maintained but the effective width reduced thereby allowing more space for tire clearance and enabling a greater range of tire sizes to be used, and increasing their accessibility.

Other purposes and objects of my invention will appear hereinafter.

In the drawings:

Figure 3 is a partial section and elevation taken on the line 3—3 of Figure 1, and illustrating the means employed at the ends of the unit frame for imparting the torsion from the suspension means to the torsion-springs.

Figure 4 is a vertical section taken about on the line 4—4 of Figure 1 and particularly illustrating the equalizing connections that I employ for connecting the adjacent ends of the aligned sections of the torsion-spring.

Figure 5 is a vertical section taken on the line 5—5 of Figure 1 and passing through the bearings for the levers that operate as part of the suspension over the axles, and showing a portion of the sub-frame or truck frame broken away.

Figure 6 is a view similar to Figure 1 but showing the invention as applied to a six wheel truck instead of a four wheel truck, and in this view one of the end wheels is broken away.

Figure 7 is a vertical section taken on the line 7—7 of Figure 6 and particularly illustrating the connection of the middle axle to the equalizing connection or differential connection that connects the spring sections or spring elements that are aligned with each other in a fore and aft direction. In this view the suspension lever is broken away.

Figures 1, 2:
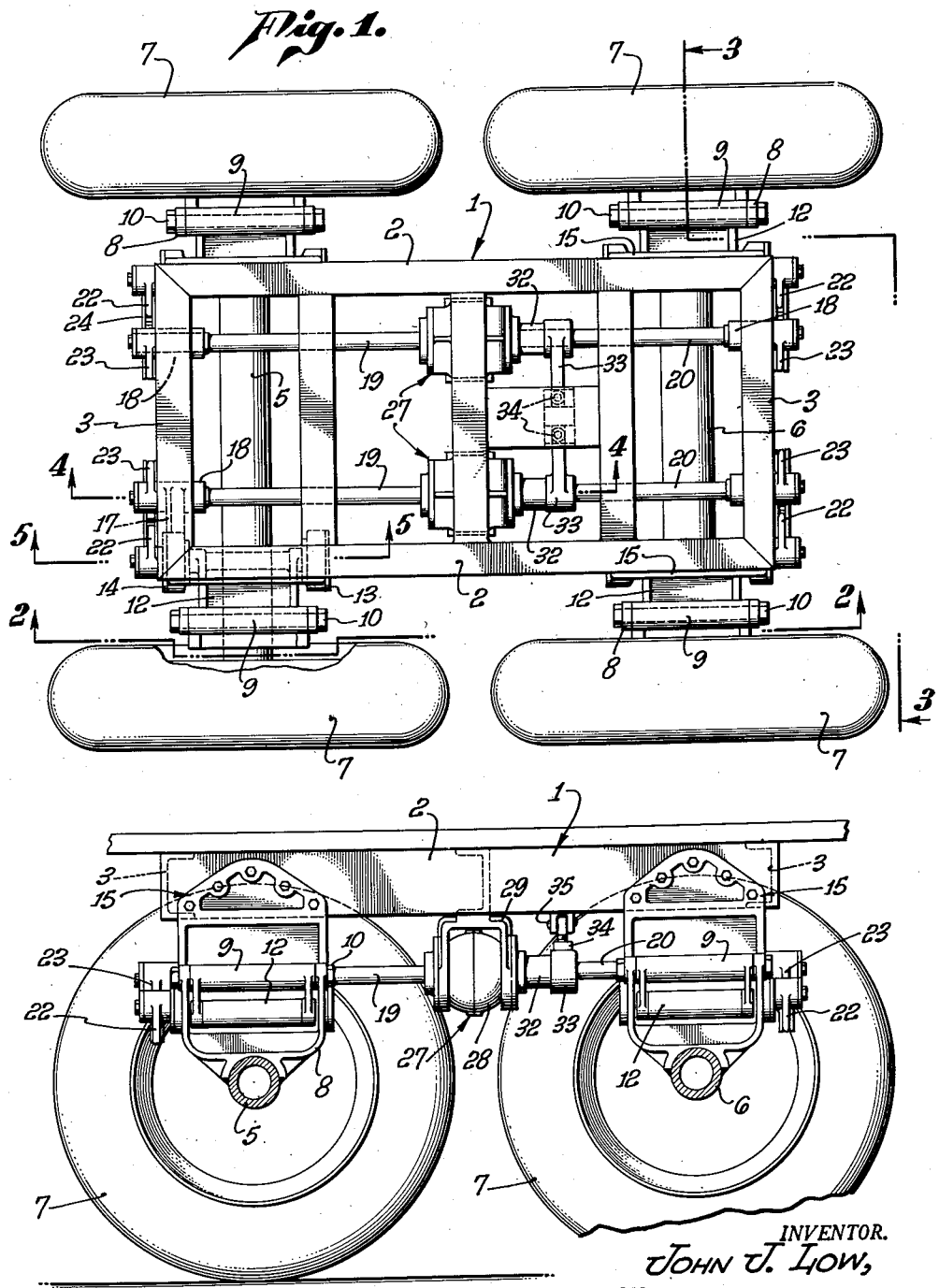
Figure 1 is a plan of a truck unit having four wheels and including one form of spring suspension embodying my invention.
Figure 2 is a vertical section taken on the line 2—2 of Figure 1, with a portion of the truck floor broken away.

Before proceeding to a more detailed description of the invention it should facilitate its disclosure to say that in the present specification I have described and illustrated the invention as applied to a two axle four wheel truck and also as applied to a three axle six wheel truck. In the case of the four wheel truck I prefer to employ a torsion-spring located at each side of the unit, and this torsion-spring includes two sections or elements that are in longitudinal alignment with each other, and which extend longitudinally with the fore-and-aft axis of the truck. A differential or equalizing connecting mechanism is employed for connecting the adjacent ends of the spring sections or elements to each other. Suspension mechanisms or means associated with each end of the axles are connected to the remote ends of the torsion elements in such a way that a torque is developed in these elements that resists the descent of the truck frame, and maintains the truck frame at its normal level. Any change in the torque force existing in one of these spring elements is immediately imparted to the aligned spring element or spring section through the equalizing connection.

In this four wheel or two axle type of unit, if a differential type of equalizing means is employed between the spring elements, the spider carrying the pinions for imparting the torque movements through this connection is held in a relatively fixed but adjustable position with respect to the truck frame.

In the six wheel or three axle type of truck the construction is substantially the same except that a pair of middle wheels on a middle axle are employed, and in this case, as before, aligned spring elements are connected to each other through an equalizer means, or differential, but in this case the spider of the differential is not maintained in a fixed position but has a controlled movement determined by movements of the suspension means for the middle axle. In this way there are three connections into the equalizing device, and the operation is such that the torque in the two aligned spring sections provides balanced resistances for the middle axle suspension. At the same time the torque forces developed in either one of the aligned spring elements will be imparted in either direction through the differential connection to the other spring element.

Referring now to Figure 1, I indicates a truck frame or sub-frame which is preferably of substantially rectangular form comprising side bars 2, 2 and end bars 3, 3. In this unit as in the six wheel unit, the construction is symmetrical with respect to the front and rear axis of the vehicle. Axles 5 and 6 carry the truck wheels 7 illustrated as provided with pneumatic tires.

The suspension means for the frame I includes a saddle bracket 8 carried on each axle end. These saddle brackets are welded or otherwise secured to the upper side of each axle. Each saddle bracket includes two separated forks betweeen which a shackle 9 is pivotally supported on suitable pivot bolts 10. This shackle inclines in an outboard direction toward its lower end where it is pivotally connected by pivot pin 11 to the free end of a lever 12. The lever is of considerable width in a fore-and-aft direction (see Figure 5) with its ends mounted in suitable bearings 13 and 14. These bearings are formed at the lower ends of side brackets 15 that are provided above with angular seats 16 for the under side of the frame I (see Figure 3).

These side brackets 15 have integral end plates or extensions 17 that project inboard and terminate in bearings 18 for receiving the remote ends of the spring sections 19 and 20 which are aligned with each other and which together form the torsion-spring at each side of the unit. These spring elements, or sections, preferably consist of steel shafts of fine quality which have sufficient resiliency to withstand the great torsion forces and torques to which they are subjected under varying road conditions.

The lever 12 on its axis of rotation in its bearings 13 and 14 (see Figure 5), is provided with a stub shaft 21, and any suitable means is provided for imparting torque or rocking movement of this stub-shaft to its adjacent spring element. As illustrated in Figure 3, this is preferably accomplished by providing two segmental sprockets 22 and 23, the former of which is secured to the stub shaft 21, and the latter of which is secured to the end of the spring element 20. A sprocket chain 24 is provided that meshes with the toothed edges of these sprockets, and the ends of this chain are attached by pivot pins 25 and 26, respectively, to the remote portions of the sprockets (see Figure 3).

Referring now to Figure 4 each of the spring elements 19 and 20 extends into a torque transmitter, equalizer connection preferably in the form of a differential 27 which includes a spider 28 of shell form supported on a forked bracket 29 on the under side of the truck frame or sub-frame I. The forks of this bracket 29 have roller bearings 30 for supporting tubular integral necks 31 formed on the ends of the spider, and one of these tubular necks has an extension forming a sleeve 32 of reduced diameter that extends along the spring element or shaft 20 in order to provide an anchorage for the spider 28 to the frame I. For this purpose the end of the sleeve 32 is provided with a rigidly secured anchor arm 33 that projects inboard, with its inner end attached to a turn-buckle 34 extending upwardly and attached by pivot pin 35 to the under side of the sub-frame I.

The differential 27 has the usual construction and mode of operation for differentials, that is to say, it is provided with two or more radially disposed bevel pinions 36 carried in a spider, that mesh on opposite sides with bevel gears 37 and 38 splined, respectively, to the ends of the spring elements 20 and 19.

The means for imparting the torque forces from the suspension means of the axles 5 and 6 to the spring elements 19 and 20 may employ sprockets and chains similar to those illustrated in Fig. 3, or as illustrated in Fig. 7, so long as the sprockets and chains are so related to each other that the direction of rotation of each of the elements 19 is the same as that of the element 20 coupled therewith for like movements of the axles 5 and 6 relative to the frame I.

With this type of equalizing connection 27 it will be evident that if a road condition is encountered that causes a relative downward movement of the rear end of the unit over the axle 6, the bearings 13 and 14 for the lever 12 (see Figure 3) will move down toward the ground level, and this will cause rotation of the sprockets 22 in an inboard direction on their upper sides, as indicated by the arrows on the sprockets in Fig. 3. This rotation would be imparted through the bevel gear 37 and the pinions 36 to the other bevel gear 38, causing rotation in the forward spring element 19 in the direction to increase the torque therein. In this manner an increased torque in either one of the spring elements 19 and 20 will be "equalized," that is, it will be transferred in either direction through the equalizer connection 27 to the other aligning spring elements, so that each spring element may supplement or reinforce the action of the other.

Referring now to Figures 6 and 7, this unit includes a relatively long frame 40 extending longitudinally in the fore-and-aft direction of the truck over wheels which include forward wheels 41, intermediate wheels, 42, and rear wheels 43, mounted on corresponding axles 45, 46, and 47. These axles are attached by suspension means 48, similar to that illustrated in Figure 3, to suspension levers 49 (see Figure 7). All these levers 29 would, of course, be mounted and constructed as illustrated in Figure 5.

The aligned spring elements or spring shafts 50 and 51 are mounted at the ends of the frame 40 in the same manner as illustrated in Figure 3, and their adjacent ends extend into an equalizer device or differential 52 having the same general construction illustrated in Figure 4. In this case, however, the sleeve 54 which corresponds to the sleeve 32 of Figure 4, is not anchored to the frame, but is provided with a segmental sprocket 55, the teeth of which carry a chain 56 attached to the sprocket by pivot pin 57. The lower end of this chain meshes with the teeth of a segmental sprocket 58, and the lower end of the chain is attached by a pivot pin 59 to the lower portion of the sprocket 58 in the manner illustrated in Fig. 7. Now if the middle wheel 42 rises relatively to the frame 40, or the frame 40 moves down relative to the wheel 42, the sprocket 55 and the upper side of the spider 53 will be moved in the outboard direction, as indicated by the arrows in Figures 6 and 7. This movement of the shell or housing 53 of the differential 52 moves its twin pinions about the axis of the differential and this will, of course, impart a rotary movement and increased torque to both of the spring shafts 50 and 51.

The driving connections at both ends of the six wheel unit, from the levers 49 to the spring shafts 50 and 51, are the same so that when the wheel 43 moves relatively upward with respect to the frame, the shaft 51 will be given the opposite direction of rotation as that just described for the spider 53 of the differential 52, that is to say, the upper side of the shaft 51 will move in an inboard direction.

With this organization of parts for the six wheel unit it will be evident that any increase of torque in either the spring shaft 50 or 51 will be imparted through the pinions of the differential 52 to the other aligned shaft, assuming that at the instant the spider of the differential is standing still. Of course, if there is any change in the height of the road surface under the middle wheels this will affect the pinions corresponding to the pinions 36, and impart a corresponding movement to one or the other of the shafts 50 or 51. As the pinions can rotate on their own axes, the torque developed by rocking of the spider on the axis of the differential will be equalized through the differential to the two shafts. By adjusting the turnbuckles 34, the level or height of the truck frame with respect to the axles, can be regulated.

It will be evident that in both the four wheel type and the six wheel type of unit the axle suspensions are all equalized to each other so that as far as possible there will be equal distribution of the load on all the axles. This insures uniform action of the wheels as drivers if the wheels are driven wheels.

Although I have described certain specific directions of rotation for the spring shafts, as a matter of fact, the principal consideration on this point, is the relative directions of rotation for the different elements of the construction regarded as a suspension system.

I claim as my invention:

1. In a torsion-spring suspension for vehicles: the combination of a frame; a plurality of axles with wheels at the side of the frame spaced from each other in a fore-and-aft direction; suspension means connecting the axles to the frame for up and down movement of the frame relative to the wheels; torsion mechanism connected at a point to said frame and including a plurality of torsion spring sections; with inherently flexible means connecting the spring sections to the suspension means to maintain torque in the spring sections for resisting a downward movement of the frame relative to the axles, said means being so constructed and arranged as to leave said spring elements free of restraint when free of torque.

2. In a torsion-spring suspension for vehicles: the combination of a frame; axles; a pair of wheels carried by said axles at the side of the frame; suspension means connecting the axles respectively to the frame for up and down movement of the frame relative to the wheels; torsion mechanism including a torsion spring section corresponding to each wheel; means for anchoring the torsion mechanism to the frame; and means including a flexible element connecting the suspension means respectively to said spring sections to develop torque therein resisting the descent of the frame relative to the wheels, said means being capable of flexing when the spring sections respective thereto are free of torque.

3. A torsion-spring suspension according to claim 2, including means for transferring torque in one of said spring sections to the other spring section.

4. In a torsion-spring suspension for vehicles; the combination of a plurality of axles with wheels at their ends; saddle brackets seated near the ends of said axles; a frame between said saddle brackets; spring torsion mechanism carried under said frame including a pair of aligned shafts at each side of the frame; suspension means supported on said saddle brackets; chain means connecting said suspension means with the torsion mechanism and maintaining torque in said shafts; and means connecting the adjacent ends of said shafts for equalizing the torque therein.

5. In a torsion-spring suspension for vehicles: the combination of a vehicle frame; axles under the frame; ground wheels carried thereby including three wheels at the side of said frame, said axles comprising a middle axle, a forward axle and an after axle; a torsion spring including two spring sections in alignment with each other; suspension means connecting each axle to said frame for up and down movement of the frame relative to the axles; means connecting said suspension means of the forward axle and the rear axle to the remote ends of said spring sections, to develop torque in the same; an equalizer differential mechanism connecting the adjacent ends of said spring sections and including a spider with pinions for imparting torque to and fro between said spring sections; and means connecting said spider to the suspension means of the middle axle so that downward movement of said frame relative to the middle axle, develops equalized torque in said two spring sections.

6. A torsion-spring suspension according to claim 5, in which said spider is mounted for rotation on the aligned axes of the spring sections, and its connection to the middle axle suspension rocks the spider on the axis of the differential mechanism as the frame moves up or down relatively to the middle axle.

7. In a torsion-spring suspension for vehicles: the combination of a frame having a pair of substantially parallel side bars; a pair of axles with wheels; outwardly projecting levers mounted under the frame to rock on substantially horizontal axes; means including shackles for supporting the outer ends of said levers on said axles; a torsion spring including two aligned resilient shafts at each side mounted for rotation on their axes; chain and sprocket means connecting the said levers to the remote ends of said shafts to exert a torque in the same; and equalizing mechanisms connecting the adjacent ends of said shafts enabling torque forces to be imparted to and fro between said shafts.

8. In a torsion-spring suspension for vehicles: the combination of a torsion spring including two longitudinally aligned spring elements; forward wheels and rear wheels; axles carrying the same; suspension means for the forward and rear axles for setting up torque respectively in said spring elements and exerted in the same directions about the axes of the elements so as to oppose the torques in the same, to each other; a middle axle with wheels, between the first named axles; a differential mechanism connecting the adjacent ends of said spring elements, including a spider, pinions carried thereby, and bevel gears on said spring elements meshing with said pinions; and a suspension means for said middle axle connected to said spider to rock the same on the axis of the differential and thereby impart torque through said pinions to said spring elements.

9. In a torsion-spring suspension for vehicles; the combination of axles for wheels; a truck frame above the axles; suspension means corresponding to the axles; a torsion spring including separate torsion elements; chain and sprocket means operatively connecting said suspension means to said torsion elements for setting up torque therein; and transmission means for effecting transmission of the torque in each of said torsion elements to the other torsion elements.

10. In a torsion spring suspension for vehicles, the combination of: a forward axle, a middle axle, and an after axle for wheels; a truck frame above the axles; suspension means corresponding to the axles; a torsion spring including separate torsion elements; means operatively connecting said suspension means to said torsion elements for seting up torque therein; and transmission means for effecting transmission of the torque in each of said torsion elements to the other torsion elements of said spring, and operatively connected to the suspension means of said middle axle so as to develop torque therefrom in said torsion means.

11. In a torsion-spring suspension for vehicles; the combination of axles for wheels; a truck frame above the axles; suspension means corresponding to the axles; a torsion spring including separate torsion elements; chain and sprocket means operatively connecting said suspension means to said torsion elements for setting up torque therein; transmission means for effecting transmission of the torque in each of said torsion elements to the other torsion elements; said axles including forward axles, aft axles, and a middle axle between the same; means of operative connection from the suspension means of the middle axle to the transmission means; said transmission having means for developing torque in said torsion elements from the said suspension means of said middle axle.

JOHN J. LOW.

REFERENCES CITED

The following references are of record in the file of this patent:

UNITED STATES PATENTS

| Number | Name | Date |
|---|---|---|
| 1,984,978 | Moffitt | Dec. 18, 1934 |
| 2,333,650 | Hickman | Nov. 9, 1943 |
| 2,349,289 | Larison | May 23, 1944 |

FOREIGN PATENTS

| Number | Country | Date |
|---|---|---|
| 193,503 | Switzerland | Jan. 3, 1938 |